United States Patent [19]

Batten-Carew et al.

[11] Patent Number: 5,968,177

[45] Date of Patent: Oct. 19, 1999

[54] METHOD AND APPARATUS FOR PROCESSING ADMINISTRATION OF A SECURED COMMUNITY

[75] Inventors: Mark Batten-Carew, Kanata; Marek Buchler, Ottawa; Stephen William Hiller, Ottawa; Josanne Mary Otway, Ottawa, all of Canada

[73] Assignee: Entrust Technologies Limited, Canada

[21] Appl. No.: 08/949,609

[22] Filed: Oct. 14, 1997

[51] Int. Cl.⁶ ..................................................... G06F 11/00
[52] U.S. Cl. ................................. 713/201; 380/21; 380/25
[58] Field of Search ................................... 713/200, 201, 713/202; 709/229; 707/9; 380/21–23, 25–30, 42, 43

[56] References Cited

U.S. PATENT DOCUMENTS

| | | | |
|---|---|---|---|
| 4,835,673 | 5/1989 | Rushby et al. | 364/200 |
| 5,017,917 | 5/1991 | Fisher et al. | 340/825.79 |
| 5,787,172 | 7/1998 | Arnold | 380/21 |

OTHER PUBLICATIONS

Wood et al., "Decentralized Authorization in a Database System", IEEE, pp. 352–359, Aug. 1979.
Tolcher, "Project Admiral–The Management of Services on an Internet", IEEE, pp. 267–270, Jan. 1988.
Woo et al., "Authorization in Distributed Systems: A Formal Approach", IEEE, pp. 33–50, Jan. 1992.

*Primary Examiner*—Robert W. Beausoliel, Jr.
*Assistant Examiner*—Scott T. Baderman
*Attorney, Agent, or Firm*—Markison & Reckamp

[57] ABSTRACT

A method and apparatus for processing administration in a secure community, or communication system, is accomplished by dividing the single computing devices functionality of the administrator/officer/server into physically separate computing devices that function as a serving entity and an administrative entity. In the secure system, when an administrative entity has an administrative function to perform for one of its end-users, it requests a permissions matrix from the serving entity. The serving entity, after authenticating the administrative entity, sends the permissions matrix to the requesting administrative entity in an encoded format. The permissions matrix indicates which administrative functions the requesting administrative entity is authorized to perform for its affiliated end-users. Upon receiving the permissions matrix, the administrative entity verifies the authenticity of the permissions matrix based on the encoded format. When the authenticity of the permissions matrix is verified, the administrative entity generates an administrative request based on an administrator's input and the permissions matrix and sends it to the serving entity over a secure communication link. Upon receiving the administrative request, the serving entity verifies the identity of the administrative entity, verifies validity of the request according to the permissions matrix, and, if verified, processes the administrative requests on behalf of the particular end-user.

33 Claims, 5 Drawing Sheets

METHOD AND APPARATUS FOR PROCESSING ADMINISTRATION OF A SECURED COMMUNITY

TECHNICAL FIELD OF THE INVENTION

This invention relates generally to encryption more particularly to the administration of certificate management within a secured communication system.

BACKGROUND OF THE INVENTION

As is known, a secure communication system includes a plurality of end-users (sometimes referred to as "clients"), and at least one processor for each of a server/manager, an officer, and an administrator. The administrator is affiliated with the end-users, or clients, and processes, signs, and/or encrypts certificates for such end-users. For example, the administration processor processes the adding, deleting, updating, and preparing status reports of end-users' signature public key pairs and encryption public key pairs. As a further example, when an end-user leaves the secured communication system, the administrator, via an administration processor, disables the end-user's signature and deletes the encryption public key certificate from a directory. The directory lists the public key certificates for each end-user within the secured communication system. When an end-user is added to the secured communication system, the administrator, via the administration processor, supplies a request to the server that is requesting the server enable the new end-user for certificate management. When an end-user has lost access to his or her private key history, the administrator, via the administration processor, requests that the server recover the end-user's key.

In the secure communication system, the administration processor, the officer processor, and server are located within a single computing unit. Thus, any requests received by the server from the administration processor can readily be authenticated because they are both part of the same machine. Similarly, when the officer initiates policy changes, the policy changes can be securely conveyed to the administration processor and the server, again because they are in the same machine. While this works well in many applications, as secure communication systems grow in number of end-users and locales, the task of managing the administration processor and the officer processor exceeds the realistic capabilities of the single administrator/officer/server computing device. Thus, without developing a new secured communications system architecture that eliminates the single administrator/officer/server computing device, secured communication system growth is limited.

Therefore, a need exists for a method and apparatus for processing administration of a secure community, or communications system, that allows for expansion of the number of end-users and their locales.

SUMMARY OF THE INVENTION

Generally, the present invention provides a method and apparatus for processing administration in a secure community, or communication system. This is accomplished by dividing the single computing device's functionality of the administrator/officer/server into physically separate computing devices that function as a serving entity and an administrative entity. Because the administrative entity and serving entity are separate computing devices, communication between the two entities needs to be authenticated and the administrative functions tightly controlled. To this end, when an administrative entity has an administrative function to perform for one of its end-users, it requests a permissions matrix from the serving entity. The serving entity, after authenticating the administrative entity, sends the permissions matrix to the requesting administrative entity in an encoded format. The permissions matrix indicates which administrative functions the requesting administrative entity is authorized to perform for its affiliated end-users.

Upon receiving the permissions matrix, the administrative entity verifies the authenticity of the permissions matrix based on the encoded format. For example, assume that the serving entity encoded the permissions matrix using a public/private key encryption process and signature public key certificate. To authenticate the permissions matrix, the administrative entity verifies that the signature public key certificate is that of the serving entity. If so, the administrative entity can trust that the permissions matrix came from the serving entity and is thus authenticated.

When the authenticity of the permissions matrix is verified, the administrative entity generates an administrative request based on an administrator's input and the permissions matrix. The administrator's input, which is done by an administrator on behalf of an end-user affiliated with the administrative entity, indicates the particular administration function to be processed for the end user. The administrative entity sends the administrative request to the serving entity over a secure communication link. Upon receiving the administrative request, the serving entity verifies the identity of the administrative entity. This is done using the signature of the administrative entity. Once verified, the serving entity processes the administrative requests on behalf of the particular end-user. With such a method and apparatus, the serving entity and administrative entity are divided into separate computing devices. The officer of previous systems has been rolled into the administrative entity thus enabling selected administrative entities to establish the policy for the secured communication system. By having the administrative entity and serving entity being in physically separate computing devices, a secured communications system may grow in number of end-users and locales.

DETAILED DESCRIPTION OF A PREFERRED EMBODIMENT

Figure 1:
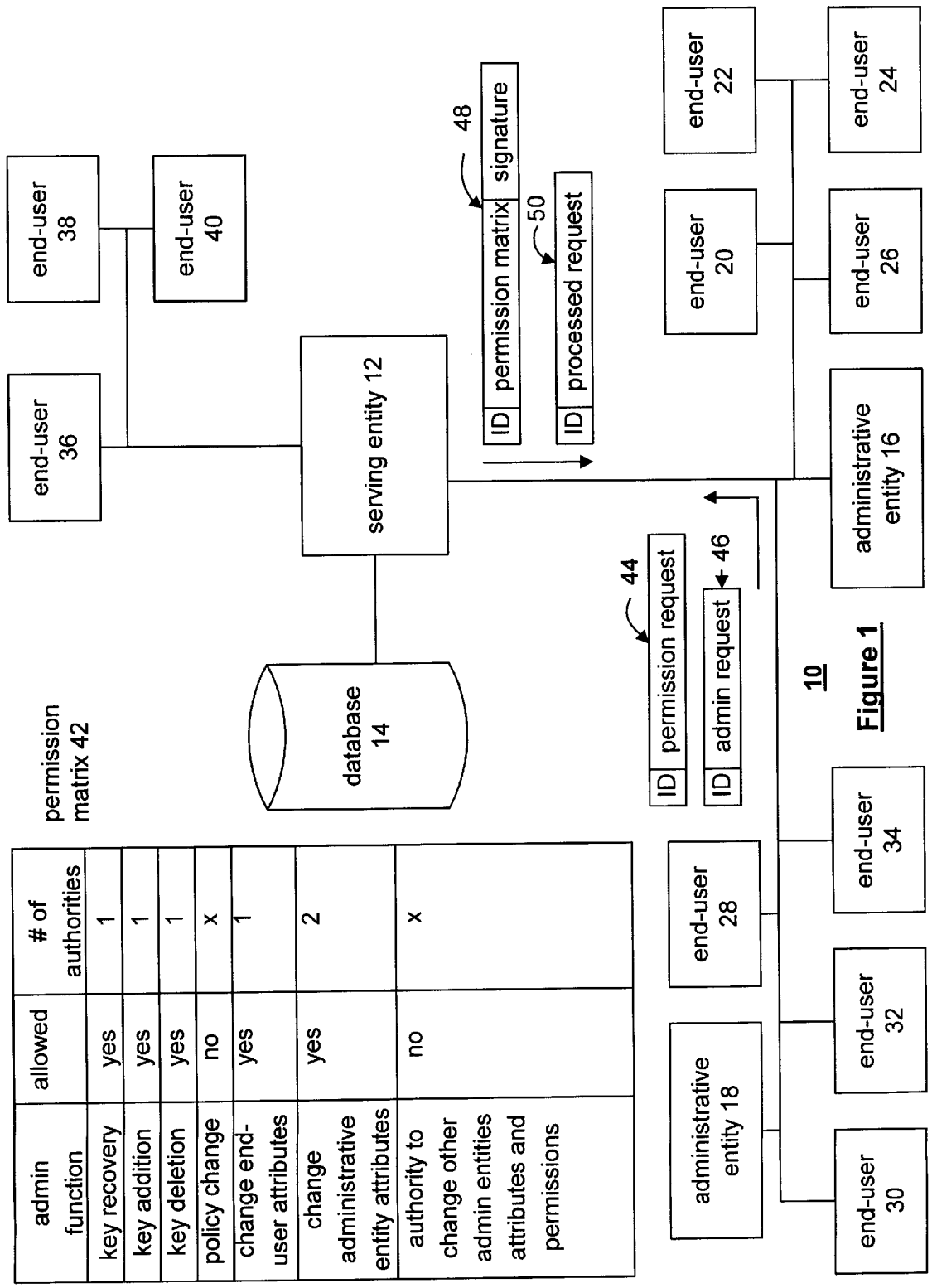
FIG. 1 illustrates a schematic block diagram of a secured communications system in accordance with the present invention.

The present invention can be more fully described with reference with FIGS. 1 through 5. FIG. 1 illustrates a schematic block diagram of a secured communications system (or community) 10 that includes a serving entity 12, a database 14, a plurality of administrative entities 16, 18, and a plurality of end-users 22–40. The serving entity 12 may be an individual stand alone computing device that includes a microprocessor, microcontroller, digital signal processor, or any other device that manipulates digital information based on programming instructions, or a plurality of computing devices. Alternatively, the serving entity could be a plurality of computing devices that function as stand-alone devices or that is networked together. In general, the serving entity 12 functions as the key management server, wherein the serving entity 12 includes Entrust/manager software, which is manufactured by Entrust Technologies, Ltd.

The end-users 22–40 are stand-alone computing devices that are equipped with encryption software such as the Entrust/Client software manufactured and distributed by Entrust Technologies, Ltd. The end-users, with the Entrust/Client software, are enabled to securely transmit encrypted messages to each other using the public key of the recipient end-users. Note that the end-users are shown in three separate groups. The first group of end-users includes end-user 20 through 26, the second group includes end-user 28 through 34, and the third group includes end-user 36 through 40. The grouping of end-users is done for illustration purposes to demonstrate that end-users may be in physically separate locales. For example, if the secured communications system 10 is owned and operated by a large multinational company, the first group of end-users 20–26 may be located in one country, while the end-users in the other two groups may be located in different countries.

As shown, the administrative entity 16 is affiliated with end-users 20–26 and administrative entity 18 is affiliated with end-users 28–34. Each of these administrative entities 16 and 18 performs certificate administrative functions for their local end-user groups. Such administrative functions include key recovery, key addition, key deletion, policy change, change of an end-user attributes, change of the administrative entities attributes, and authority to change other administrative entities attributes and permissions. These administrative functions are shown in the permissions matrix 42. Note that one or both of the administrative entities 16 and 18 will process certificate administrative functions for the group of end-user 36–40.

The permissions matrix 42 includes a field for administrative functions, an allowed field and a number of authorities field. The allowed field provides an indication as to whether the administrative entity is allowed to perform the corresponding administrative functions. The number of authorities field provides an indication as to the number of administrative entities that must authorize, or sign, the corresponding administrative function before the serving entity will execute it. The illustrated permissions matrix 42 includes the administrative functions of: key recovery, key addition, key deletion, policy change, change end-user attributes, change administrative entity attributes, authority to change other administrative entities attributes and permissions. Of the administrative functions, the corresponding administrative entity is allowed to perform all of the functions except policy change and changing other administrative entities' attributes and permissions. For the functions that this administrative entity is allowed to perform, all but the change attributes of the administrative entity (i.e., change its own attributes) can be done with a single administrative entity authorization.

As mentioned, the administrative functions of the permissions matrix 42 include, but is not limited to: key recovery, key addition, key deletion, policy change, change end-user attributes, change administrative entity attributes, authority to change other administrative entities attributes and permissions. Key recovery is an administrative function that enables the administrative entity to request, on behalf of an end-user that has lost his or her private key, to recover the private key from the serving entity. Key addition and key deletion allow the administrative entity to add or delete end-users to their affiliated group by requesting of the serving entity that public key pairs are either added or deleted for a particular end-user. The secured policy change enables a selected administrative entity to determine which administrative entities will service which group of end-users, establish default security parameters for the secured communications system and other officer related functions. Changing the attributes of an end-user allows an administrative entity to establish the end-users certificate parameters such as public keys, level of secured access, etc. Changing the attributes of another administrative entity allows a selected administrative entity to determine which administrative functions a particular administrative entity is authorized to perform. Changing the administrator's own attributes allows the administrator to select which administrative functions it chooses to perform for its associated end-users.

In operation, the administrative entity 16, 18 provides a request to the serving entity 12. The request may be a permission request 44 or an administrative function request 46. A permission request 44 includes an identification code of the administrative entity and a request for a copy of the permissions matrix 42. In general, the administrative entity 16 or 18 only stores the permissions matrix 42 for a short inactive duration (E.g., thirty minutes or less). Thus, as long as the administrative entity is processing administrative functions for its end-users more often that once every half hour, it will retain a copy of the permissions matrix 42.

Upon receiving the permission request 44, the serving entity 12 verifies the identity of the administrative entity 16, 18 based on the identity of the administrative entity. In addition, the serving entity 12 may further verify the authenticity of the request when the request includes a signature of the administrative entity. If the administrative entity is authenticated, the serving entity 12 provides an encoded copy of the permissions matrix to the requesting administrative entity. The encoded permissions matrix message 48 includes the identity of the administrative entity, an encoded copy of the permissions matrix, and the signature of the serving entity 12.

When the administrative entity 16, 18 receives the encoded permissions matrix message 48, it authenticates the signature of the serving entity. To authenticate the signature, the administrative entity uses a trusted public key of the serving entity. If the signature verification process, which is included in Entrust/Client software, confirms that the signature corresponds with the trusted key, the signature is authenticated and the administrative entity can trust that the permissions matrix came from the serving entity. Once the administrative entity 16, 18 has verified the authenticity of the signature, it stores the permissions matrix 42 such that it may utilize it to process administrative functions on behalf of its associated end-users.

The administrative entities may also transmit an administrative request 46 to the serving entity 12. The administrative request 46 includes the identity of the administrative entity, which may be an identification code, or some other unique identification means, and the particular administrative request. Typically, the administrative request will be based on the administrative entity's current copy of the permissions matrix 42. As such, the administrative entity will only request a service that it believes it is authorized to perform on behalf of its end-users.

The serving entity 12 upon receiving the administrative request 46, verifies the identity of the administrative entity and whether the requested administrative function is consistent with the permissions matrix 42 maintained by the serving entity 12 for the requesting administrative entity. If so, the serving entity 12 provides a message 50 to the requesting administrative entity. The message 50 includes the identity of the administrative entity and the particular process requests. For example, if the administrative request were for the addition of a public key pair for a new end-user, the processed request would include the public key pair for the new end-user.

By including the permissions matrix 42 in the secure communication system 10, administrative entities may be assigned the tasks of an officer wherein the assigned administrative entity performs policy changes for the overall communications system 10. The permissions matrix further allows the scaling of responsibilities of the administrative entities. For example, one administrative entity may be allowed to perform only key recovery, key addition and key deletion while another may be allowed to perform every administrative function for the communications system 10.

Figure 2:
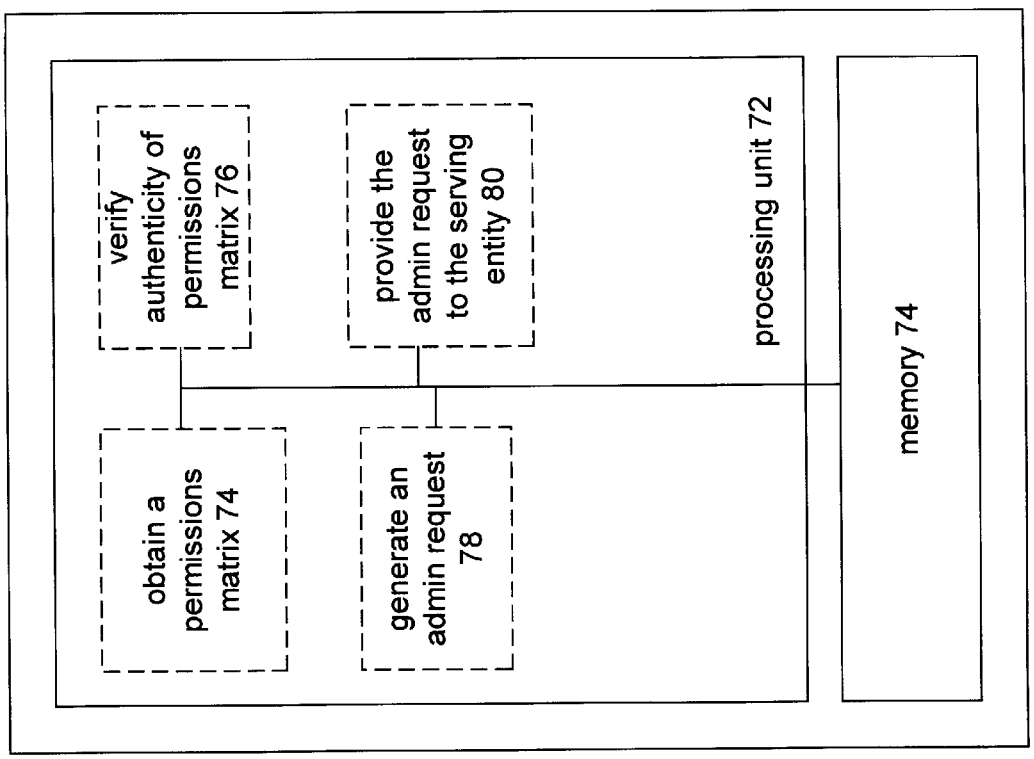
FIG. 2 illustrates a schematic block diagram of a serving entity and administrative entity in accordance with the present invention.
Figure 2:
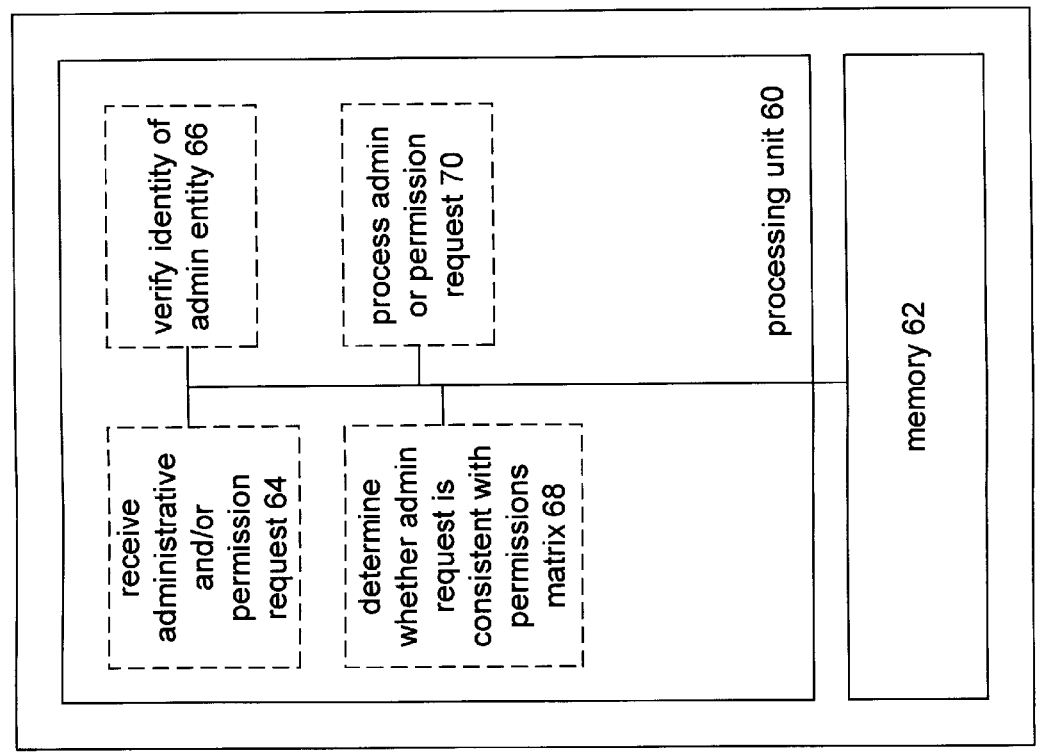

FIG. 2 illustrates a schematic block diagram of the serving entity 12 and the administrative entity 16, 18. The serving entity 12 is shown to include a processing unit 60 and memory 62. The processing unit 60 may be a microprocessor, a microcontroller, a digital signal processor, a central processing unit, or any other device that manipulates digital information based on programming instructions. The memory 62 may be read-only memory, RAM, floppy disk memory, hard drive memory, CD-ROM, DVD memory, magnetic tape, or any other means for storing digital information.

The memory 62 stores programming instructions, which when read by the processing unit 60, causes the processing unit to function as various circuits. When executing the programming instructions, the processing unit 60 functions as a circuit 64 to receive administrative and/or permission requests. Upon receiving the requests. the processing unit 60 functions as a circuit 66 to verify the identity of the administrative entity. The circuit 66 also determines whether the request is an administrative request or a permission request. Next, the processing unit 60 functions as a circuit 68 to determine whether the administrative request is consistent with the permissions matrix. Next, the processing unit 60 functions as a circuit 70 to process the administrative requests or the permission request. A more detailed discussion of the functionality of the processing unit 60 while performing the programming instructions stored in memory 62 will be discussed below with reference to FIGS. 3 through 5.

The administrative entity 16 and 18 each includes a processing unit 72 and memory 74. The processing unit 72 may be a microprocessor, a microcontroller, a digital signal processor, a central processing unit or any other device that manipulates digital information based on programming instructions. The memory may be read-only memory, RAM, floppy disk memory, hard drive memory, magnetic tape memory, DVD memory, CD memory, or any other means for storing digital information.

The memory 74 stores programming instructions that, when read by the processing unit 72, causes the processing unit 72 to function as a plurality of circuits. When reading the program instructions, the processing unit 72 functions as a circuit 74 to obtain a permissions matrix. Next, while continuing to read the programming instructions, the processing unit functions as a circuit 76 to verify authenticity of the permissions matrix. The processing unit then functions as a circuit 78 to generate an administrative request. Finally, the processing unit functions as a circuit 80 to provide the administrative request to the serving entity 80. The functionality of the processing unit 72 while performing the programming instructions stored in memory 74 will be discussed in greater detail with reference to FIGS. 3 to 5.

Figure 3:
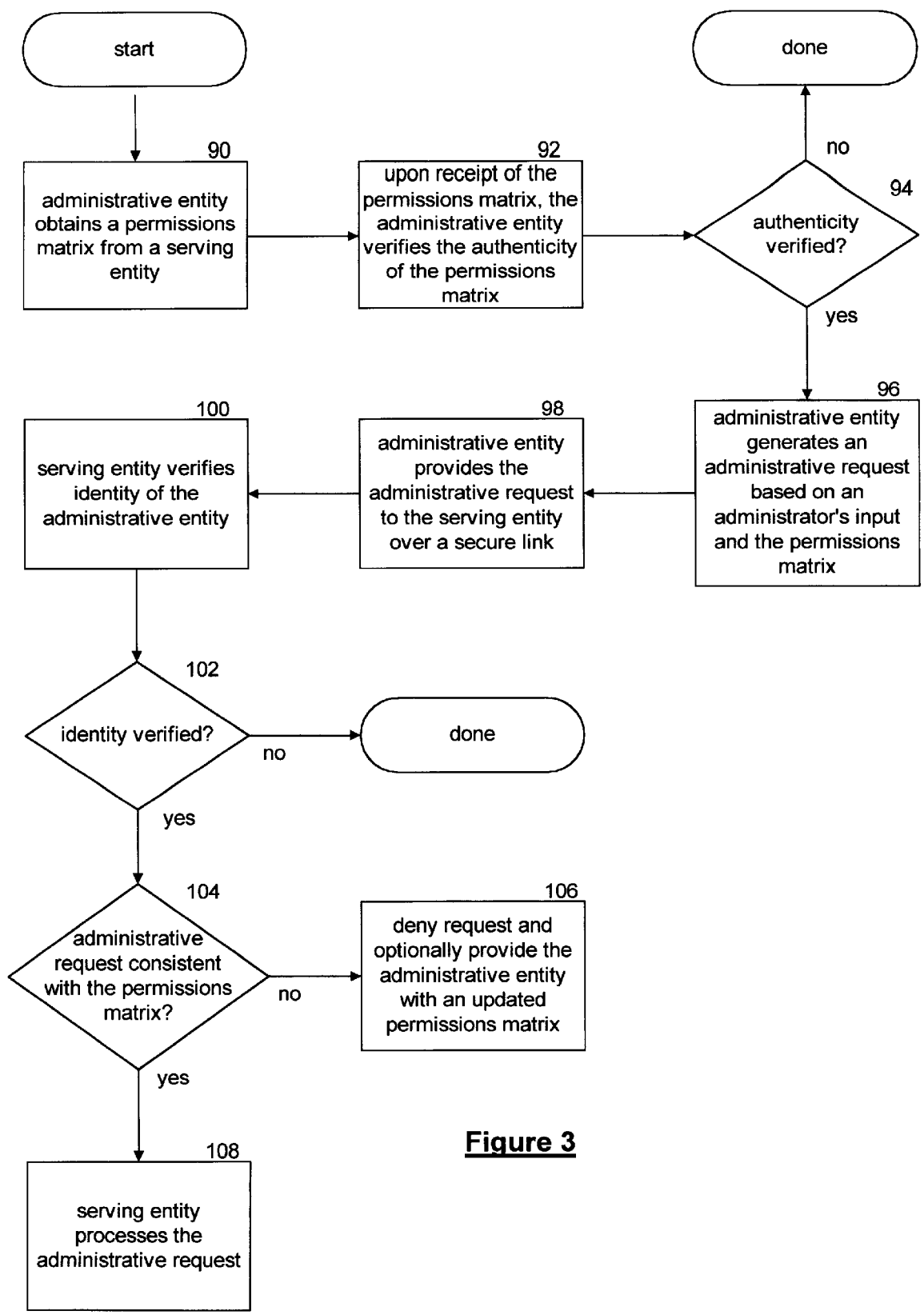
FIG. 3 illustrates a logic diagram of a method for processing administration of a secured communications system in accordance with the present invention.

FIG. 3 illustrates a logic diagram of a method for processing administrative functions in a secured communications system. The process begins at step 90 where an administrative entity obtains a permissions matrix from a serving entity, where the permissions matrix may be received from a single server, or from one of a plurality of servers. Note that the serving entity 12 of FIG. I may be a single computing device, a plurality of distributed computing devices, or one of many of a plurality of computing devices functioning as the server for the secured communications system. The permissions matrix includes a list of administrative functions that the administrative entity is authorized to process. This was discussed with reference to the permissions matrix 42 of FIG. 1.

The process then proceeds to step 92 where the administrative entity verifies the authenticity of the permissions matrix, which is done by verifying the signature of the serving entity attached to the permissions matrix message. The process then proceeds to step 94 where a determination is made as to whether the permissions matrix was authenticated or not. If not, the process is complete for this particular request. If, however, the authenticity of the permissions matrix was verified, the process proceeds to step 96. At step 96, the administrative entity generates an administrative request based on an administrative input and the permissions matrix. The administrative entity, which is a computing device, will utilize the permissions matrix to generate a graphical user interface for valid administrative options to present to an administrator. The administrator selects one or more of the valid administrative options. The administrative entity uses the selected administrative options (as administrator inputs) to generate the administrative request.

The process then proceeds to step 98 where the administrative entity provides the administrative request to the serving entity over a secured transmission link. Such a secured transmission link may be done via an on-line communication path or via a store and forward communication path. The process then proceeds to step 100 where the serving entity verifies identification of the administrative entity. This is done by verifying the identification code of the particular administrative entity and may further be done by verifying the signature of the administrative request message.

The process proceeds to step 102 where a determination is made as to whether the identity of the administrative identity was verified. If not, the process is complete for this particular request. If, however, the identity of the administrative entity was verified, the process proceeds to step 104. At step 104, a determination is made as to whether the administrative request is consistent with the permissions matrix stored by the serving entity 12. Recall that an administrative entity will use its local temporary copy of its permissions matrix to generate the administrative request. If, during the time the administrative entity stored its temporary copy of the permissions matrix and the request is made, the permissions matrix stored by the serving entity, the request would be inconsistent with the permissions matrix. If the request is not consistent with the permissions matrix, the process proceeds to step 106 where the administrative request is denied. In addition, the serving entity may provide the administrative entity with an updated permissions matrix. The serving entity would recognize the need for the administrative entity to receive an updated permissions matrix based on the fact that the administrative entity requested a service that it was not allowed to perform.

If the administrative request is consistent with the permissions matrix, the process proceeds to step 108. At step 108, the serving entity processes the administrative requests. The processed request is then provided either to the administrative entity that initiated the request, or directly to the end-user. Typically, however, the processed request will be provided to the administrative entity, which will subsequently provide the information to the end-user.

Figure 4:
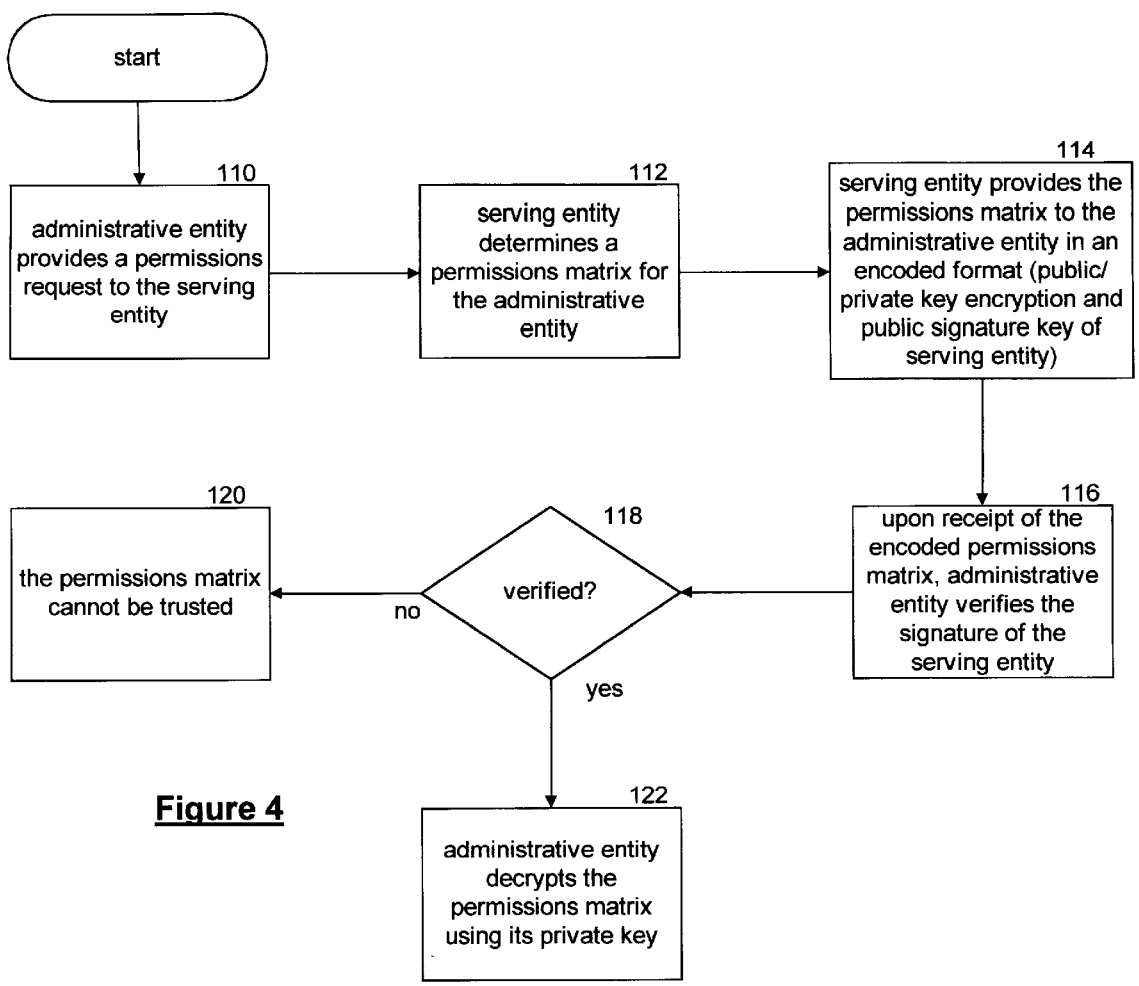
FIG. 4 illustrates a logic diagram of a method for an administrative entity to receive permissions matrix in accordance with the present invention.

FIG. 4 illustrates a logic diagram of a method for an administrative entity to receive a valid permissions matrix. The process begins at step 110 where the administrative entity provides a permission request to the serving entity. The process then proceeds to step 112 where the serving entity determines a permissions matrix for the administrative entity. Recall that at least one of the administrative entities will have authority to determine the administrative functions that other administrative entities will be allowed to perform. Based on the inputs from the selected administrative entity, the serving entity generates unique permissions matrix for each administrative entity in the system. Having determined the permissions matrix, the process proceeds to step 114 where the serving entity provides the permissions matrix to the administrative entity in an encoded format. The encoded format may be based on a public/private key encryption technique and include the signature public key of the serving entity.

Upon receiving the encoded permissions matrix, the administrative entity verifies the signature of the serving entity. The process then proceeds to step 118 where a determination is made as to whether the signature of the serving entity was verified. If not, the process proceeds to step 120 where the permissions matrix cannot be trusted. As such, the administrative entity does not retain the permissions matrix and would need to re-request the permissions matrix. If, however, the signature is verified, the process proceeds to step 122. At step 122, the administrative entity decrypts the permissions matrix using its private key. The administrative entity would then store the decrypted permissions matrix and be ready to process an administrative function.

Figure 5:
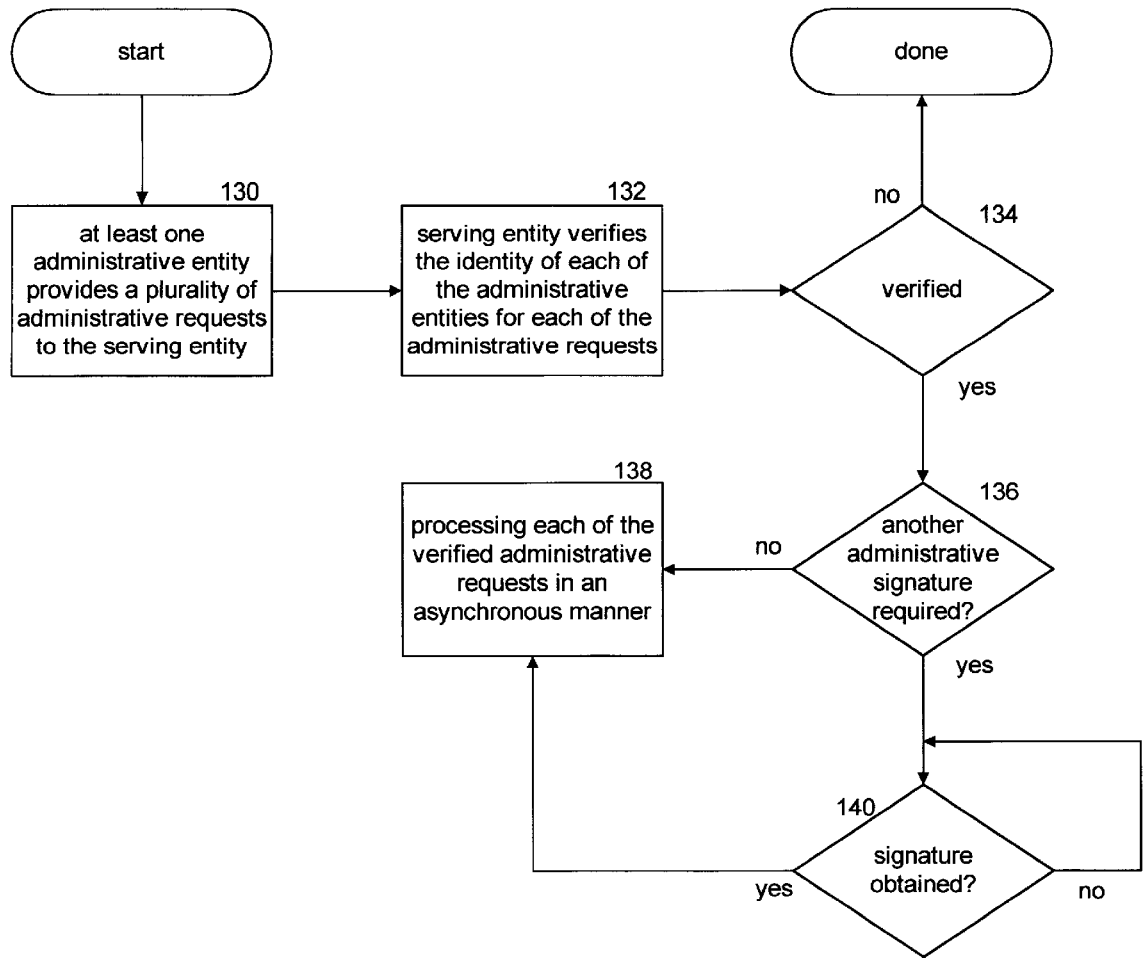
FIG. 5 illustrates a logic diagram of a method for processing a plurality of administrative requests in accordance with the present invention.

FIG. 5 illustrates a logic diagram of a method for processing a plurality of administrative requests from one or more administrative entities. The process begins at step 130 where at least one administrative entity provides a plurality of administrative requests to the serving entity. The plurality of requests may be from one administrative entity, from a plurality of administrative entities where each entity is providing one request, or from a plurality of administrative entities where each entity is providing several requests. The process then proceeds to step 132 where the serving entity verifies the identity of each administrative entity for each of the plurality of requests. The process then proceeds to step 134 where a determination is made as to whether, on a request by request basis, the identity of the administrative entity was verified. If not, the process is complete for this particular request.

For each request that the identity of the administrative entity was verified, the process proceeds to step 136 where a determination is made as to whether another administrative signature is required before the serving entity will process the request. If not, the process proceeds to step 138 where the serving entity processes each of the requests in an asynchronous manner. The asynchronous manner allows the server to complete each request as soon as the data is available and not have to wait until an earlier request is completed. As one can imagine, this improves the efficiency of the serving entity over a serial processing approach. If, however, another signature is required, the process proceeds to step 140 where a determination is made as the whether the signature has been received. If not, the process waits, for this particular request, until the signature is received. Once the signature is received, the process proceeds to step 138.

The preceding discussion has presented a method and apparatus for distributing the administrative and officer functions of a secure communication system or secure community. These functions are distributed to administrative entities that are located throughout the system. In order to ensure the security of the system, a serving entity maintains permission matrix for each of the administrative entities in the system. Administrative entities are only provided, in an encoded format, with a copy of their permissions matrix after their identity has been verified. As such, security is maintained and the growth of a secure system is no longer limited by the single administrator/officer/server device.

What is claimed:

1. A method for processing administration of a secure community, the method comprises the steps of:
   a) obtaining, by an administrative entity, a permissions matrix in an encoded format from a serving entity of the secure community;
   b) upon receiving the permissions matrix, verifying, by the administrative entity, authenticity of the permissions matrix based on the encoded format;
   c) when the authenticity of the permissions matrix is verified, generating, by the administrative entity, an administrative request based on an administrator's input and the permissions matrix, wherein the administrative request includes identity of the administrative entity;
   d) providing, by the administrative entity, the administrative request to the serving entity over a secured link;
   e) verifying, by the serving entity, identity of the administrative entity; and
   f) when the identity of the administrative entity is verified and when the administrative request is consistent with the permissions matrix, processing, by the serving entity, the administrative request.

2. The method of claim 1 further comprises, within step (a), obtaining the permissions matrix from a single server or from one of a plurality of servers.

3. The method of claim 1 further comprises, within step (a), obtaining the permissions matrix that includes a list of administrator functions that the administrative entity is authorized to process.

4. The method of claim 3 further comprises including, as the administrator functions, at least one of: key recovery, key addition, key deletion, change of secure community policy, change of end-user attributes, change of administrative entity attributes, authority to change other entities attributes and permissions.

5. The method of claim 1 further comprises, within step (a),
   from time to time, providing, by the administrative entity, a permission request to the serving entity of the secure community, wherein the permission request includes an identity of the administrative entity and a request to receive the permissions matrix;

determining, by the serving entity, the permissions matrix for the administrative entity; and providing, by the serving entity, the permissions matrix in an encoded format to the remote administrative entity.

6. The method of claim 5 further comprises:

encoding the permissions matrix using a public key of the administrative entity to produce an encrypted permissions matrix; and signing the encrypted permissions matrix by the serving entity.

7. The method of claim 6 further comprises:

upon receipt of the encrypted permissions matrix and the signature of the serving entity, verifying authenticity of the signature of serving entity; and when the signature has been authenticated, decrypting the encrypted permissions matrix using a private key of the administrative entity.

8. The method of claim 1 further comprises, within step (c), generating, by the administrative entity, graphical user interface for valid administrative options based on the permissions matrix.

9. The method of claim 1 further comprises, within step (d) providing the administrative request over a secure on-line communication path or a secure store-and-forward communication path.

10. The method of claim 1 further comprises, within steps (d)–(f):

providing, by the administrative entity, a plurality of administrative requests;

verifying, by the serving entity, identity of the administrative entity for each of the plurality of administrative requests to produce verified administrative requests; and processing, by the serving entity, each of the verified administrative requests in an asynchronous manner.

11. The method of claim 1 further comprises, within steps (d)–(f), providing a plurality of administrative requests by a plurality of administrative entities;

verifying, by the serving entity, identity of each of the plurality of administrative entities;

verifying, by the serving entity, whether each of the plurality of administrative entities is authorized to access a corresponding one of the of the plurality of administrative requests based on the permissions matrix of each of the plurality of administrative entities; and processing the corresponding ones of the plurality of administrative requests for each of the plurality of administrative entities that is authorized to access the corresponding one of the plurality of administrative requests.

12. The method of claim 11 further comprises, when access to a corresponding one of the plurality of administrative requests is not authorized because a signature of another one of the plurality of administrative entities is lacking, queuing the corresponding one of the plurality of administrative requests until the signature is received or a subsequent one of the plurality of administrative requests that completes the corresponding one of the plurality of administrative requests is received.

13. A method for an administrative entity to facilitate processing administration of a secure community, the method comprises the steps of:

a) obtaining a permissions matrix in an encoded format from a serving entity of the secure community;

b) upon receiving the permissions matrix, verifying authenticity of the permissions matrix based on the encoded format;

c) when the authenticity of the permissions matrix is verified, generating an administrative request based on an administrator's input and the permissions matrix, wherein the administrative request includes identity of the administrative entity; and d) providing the administrative request to the serving entity over a secured link.

14. The method of claim 13 further comprises, within step (a), obtaining the permissions matrix that includes a list of administrator functions that the administrative entity is authorized to process.

15. The method of claim 14 further comprises including, as the administrator functions, at least one of: key recovery, key addition, key deletion, change of secure community policy, change of end-user attributes, change of administrative entity attributes, authority to change other entities attributes and permissions.

16. The method of claim 13 further comprises, within step (a), from time to time, providing a permission request to the serving entity of the secure community, wherein the permission request includes an identity of the administrative entity and a request to receive the permissions matrix.

17. A method for a serving entity to facilitate processing administration of a secure community, the method comprises the steps of:

a) receiving an administrative request from an administrative entity over a secured link;

b) verifying identity of the administrative entity;

c) determining whether the administrative request is consistent with a permissions matrix of the administrative entity; and d) when the identity of the administrative entity is verified and when the administrative request is consistent with a permissions matrix, processing the administrative request.

18. The method of claim 17 further comprises:

from time to time, receiving, from the administrative entity, a permission request that includes an identity of the administrative entity and a request to receive the permissions matrix;

determining the permissions matrix for the administrative entity; and providing the permissions matrix in an encoded format to the remote administrative entity.

19. The method of claim 18 further comprises:

encoding the permissions matrix using a public key of the administrative entity to produce an encrypted permissions matrix; and signing the encrypted permissions matrix.

20. A server entity comprising:

a processing unit; and memory operably coupled to the processing unit, wherein the memory stores programming instructions that, when read by the processing unit, causes the processing unit to (a) receive an administrative request from an administrative entity over a secured link; (b) verify identity of the administrative entity; (c) determine whether the administrative request is consistent with a permissions matrix of the administrative entity; and (d) process the administrative request when the identity of the administrative entity is verified and when the administrative request is consistent with a permissions matrix.

21. The serving entity of claim 20 further comprises, within the memory, programming instructions that, when read by the processing unit causes the processing unit to, from time to time, receive, from the administrative entity, a permission request that includes an identity of the administrative entity and a request to receive the permissions matrix; determine the permissions matrix for the administrative entity; and provide the permissions matrix in an encoded format to the remote administrative entity.

22. The serving entity of claim 21 further comprises, within the memory, programming instructions that, when read by the processing unit causes the processing unit to encode the permissions matrix using a public key of the administrative entity to produce an encrypted permissions matrix; and sign the encrypted permissions matrix.

23. An administrative entity comprises:
a processing unit; and
memory operably coupled to the processing unit, wherein the memory stores programming instructions that, when read by the processing unit, causes the processing unit to (a) obtain a permissions matrix in an encoded format from a serving entity of the secure community; (b) upon receiving the permissions matrix, verifying authenticity of the permissions matrix based on the encoded format; (c) generate an administrative request based on an administrator's input and the permissions matrix when the authenticity of the permissions matrix is verified, wherein the administrative request includes identity of the administrative entity; and (d) provide the administrative request to the serving entity over a secured link.

24. The administrative entity of claim 23 further comprises, within the memory, programming instructions that, when read by the processing unit causes the processing unit to obtain the permissions matrix that includes a list of administrator functions that the administrative entity is authorized to process.

25. The administrative entity of claim 24 further comprises, within the memory, programming instructions that, when read by the processing unit causes the processing unit to include, as the administrator functions, at least one of: key recovery, key addition, key deletion, change of secure community policy, change of end-user attributes, change of administrative entity attributes, authority to change other entities attributes and permissions.

26. The administrative entity of claim 23 further comprises, within the memory, programming instructions that, when read by the processing unit causes the processing unit to provide, from time to time, a permission request to the serving entity of the secure community, wherein the permission request includes an identity of the administrative entity and a request to receive the permissions matrix.

27. A digital storage medium for storing programming instructions that, when read by a processing unit, causes the processing unit to facilitate processing administration of a secure community, the digital storage medium comprises:
first means for storing programming instructions that, when read by the processing unit, causes the processing unit to receive an administrative request from an administrative entity over a secured link;
second means for storing programming instructions that, when read by the processing unit, causes the processing unit to verify identity of the administrative entity;
third means for storing programming instructions that, when read by the processing unit, causes the processing unit to determine whether the administrative request is consistent with a permissions matrix of the administrative entity; and
fourth means for storing programming instructions that, when read by the processing unit, causes the processing unit to process the administrative request when the identity of the administrative entity is verified and when the administrative request is consistent with a permissions matrix.

28. The digital storage medium of claim 27 further comprises means for storing programming instructions that, when read by the processing unit causes the processing unit to receive from the administrative entity a permission request that includes an identity of the administrative entity and a request to receive the permissions matrix; determine the permissions matrix for the administrative entity; and provide the permissions matrix in an encoded format to the remote administrative entity.

29. The digital storage medium of claim 28 further comprises storage means for storing programming instructions that, when read by the processing unit causes the processing unit to encode the permissions matrix using a public key of the administrative entity to produce an encrypted permissions matrix; and sign the encrypted permissions matrix.

30. A digital storage medium for storing programming instructions that, when read by a processing unit, causes the processing unit to facilitate processing administration of a secure community, the digital storage medium comprises:
first means for storing programming instructions that, when read by the processing unit, causes the processing unit to obtain a permissions matrix in an encoded format from a serving entity of the secure community;
second means for storing programming instructions that, when read by the processing unit, causes the processing unit to upon receiving the permissions matrix, verifying authenticity of the permissions matrix based on the encoded format;
third means for storing programming instructions that, when read by the processing unit, causes the processing unit to generate an administrative request based on an administrator's input and the permissions matrix when the authenticity of the permissions matrix is verified, wherein the administrative request includes identity of the administrative entity; and
fourth means for storing programming instructions that, when read by the processing unit, causes the processing unit to provide the administrative request to the serving entity over a secured link.

31. The digital storage medium of claim 30 further comprises means for storing programming instructions that, when read by the processing unit causes the processing unit to obtain the permissions matrix that includes a list of administrator functions that the administrative entity is authorized to process.

32. The digital storage medium of claim 31 further comprises storage means for storing programming instructions that, when read by the processing unit causes the processing unit to include, as the administrator functions, at least one of: key recovery, key addition, key deletion, change of secure community policy, change of end-user attributes, change of administrative entity attributes, authority to change other entities attributes and permissions.

33. The digital storage medium of claim 30 further comprises means for storing programming instructions that, when read by the processing unit causes the processing unit to provide, from time to time, a permission request to the serving entity of the secure community, wherein the permission request includes an identity of the administrative entity and a request to receive the permissions matrix.

* * * * *